May 27, 1952 R. T. BURNETT 2,598,501
TRANSMISSION
Filed July 30, 1948 3 Sheets-Sheet 1

INVENTOR.
RICHARD T. BURNETT
BY Cecil F Arens
ATTORNEY

May 27, 1952 R. T. BURNETT 2,598,501
TRANSMISSION
Filed July 30, 1948 3 Sheets-Sheet 2

INVENTOR.
RICHARD T. BURNETT
BY Cecil F Arens
ATTORNEY

INVENTOR
RICHARD T. BURNETT
BY Cecil F Arens
ATTORNEY

Patented May 27, 1952

2,598,501

UNITED STATES PATENT OFFICE 2,598,501

TRANSMISSION

Richard T. Burnett, South Bend, Ind., assignor to Bendix Aviation Corporation, South Bend, Ind., a corporation of Delaware Application July 30, 1948, Serial No. 41,559

9 Claims. (Cl. 74—677)

1

This invention relates to transmissions embodying hydro-kinetic torque converters.

An important object of the invention is to provide a hydro-kinetic transmission in which the reaction wheel is rotated forward during torque multiplication to thereby obtain rising engine speed with increasing speed ratio when used with an internal combustion engine.

Another important object of the invention resides in the provision of a transmission equipped with a hydro-kinetic torque converter having rotatable bladed turbine and reaction wheels, interconnected through a planetary gear train in such a manner that the turbine wheel drives the reaction wheel forward at times of torque multiplication.

A still further important object of the invention resides in the provision of a transmission embodying a hydro-kinetic torque converter interconnected with a single planetary gear train in such a manner as to provide forward and reverse drive.

An object of the invention resides in the provision of a transmission having continuous variable speed and torque without shifts or interruptions or sudden change of input speed.

A yet further object of the invention is to provide a fluid pump for a hydro-kinetic transmission, which pump may be connected either directly to the input shaft to be engine driven, or to the output through a planetary gear train when a vehicle in which the transmission is incorporated is being pushed or towed for starting.

The above and other objects and features of the invention will be apparent from the following description of the apparatus taken in connection with the accompanying drawings which form a part of this specification, and in which.

Figure 1:
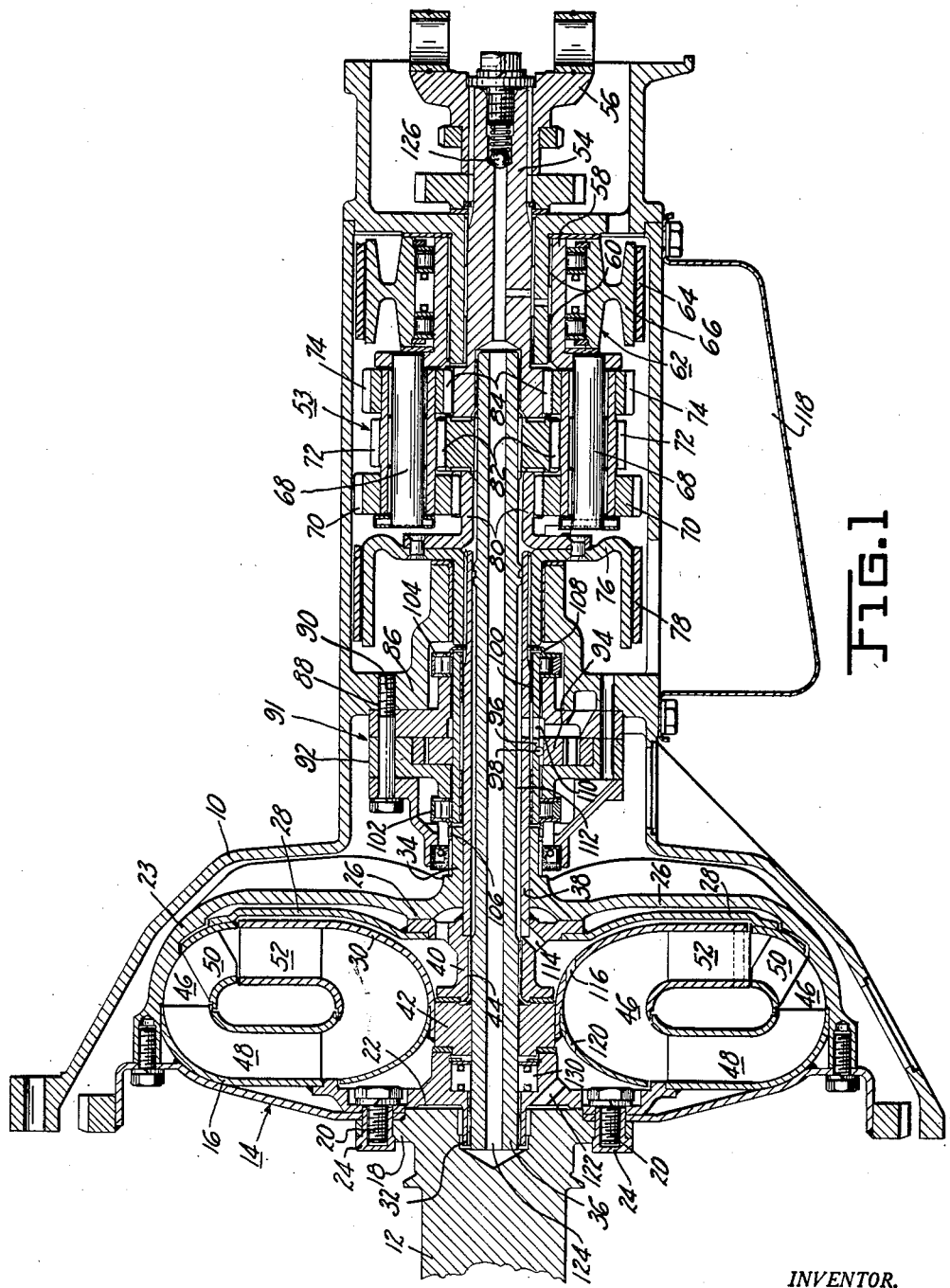
Figure 1 is a longitudinal sectional view of the transmission of the invention, with parts in elevation.

Referring now to Figure 1 for a detailed description of the transmission of my invention, the reference numeral 10 designates a housing which may be suitably secured to an automobile engine, not shown. Energy from the engine is transferred to an input shaft or crankshaft 12, which is drivably connected to a hydro-kinetic torque converter 14.

The torque converter comprises an impeller

2 wheel 16 carried by a flange 18 integral with one end of the input shaft. Bolt studs 20 pass through a support 22 of the impeller wheel and threadedly engage bushings 24, peripherally spaced around the flange. The impeller wheel 16 is further equipped with a second support 26, axially spaced apart from said support 22 and together therewith provides an enclosure or shroud 28 for turbine wheel 28 and reaction or guide wheel 30. The supports 22 and 26 have out-turned portions 32 and 34 respectively formed integral therewith to provide hollow stub shaft members. These hollow stub shaft members 32 and 34 rotatably support one end of concentric sleeves or shafts 36 and 38 respectively. The turbine and reaction wheels 28 and 30 are provided with hubs 40 and 42 respectively, which fit over said one end of sleeve 36. The hubs are carried on the sleeve 36 between the hollow stub shaft members 32 and 34. Hub 40, of the turbine wheel, is rotatably supported on a sleeve bearing 44, interposed between the hub and said sleeve 36. Hub 42, of the reaction wheel, is securely fixed to sleeve 36. The impeller, turbine, and reaction wheels are so shaped that together they provide a closed hydraulic circuit or toroidal channel 46, through which fluid is circulated by impeller blades or vanes 48 mounted in a circular row on the impeller wheel. This moving fluid, set in motion by the impeller blades, acts on blades or vanes 50 disposed in a circular row on the turbine wheel, to thereby impart rotation to the turbine wheel. The reaction wheel 30 is equipped with a circular row of blades or vanes 52, which are constituted to take reaction from the moving fluid as well as control the direction of flow of the fluid at the entrance of the impeller wheel, to thereby multiply torque into the turbine wheel. The construction and arrangement of the vanes are such as to produce an overdriving effect on the turbine wheel, as described in my application entitled "Torque Converter," Serial No. 701,595, filed October 5, 1946. Although the torque converter of the instant application utilizes the same principles for obtaining overdrive, as my previously mentioned filed application, the design and arrangement of the impeller and turbine vanes of the herein disclosed converter differ over the earlier filed application.

A torque multiplying planetary gear train 53 is interposed between the torque converter 14 and output shaft 54, to the outer end of which is splined a yoke 56. The gear train comprises a planet carrier 58, revolvably mounted on sleeve bearings 60. A free wheel device 62 is interposed between the planet carrier 58 and a brake band 64 to allow free rotation of said planet carrier in one direction beyond a one-to-one torque ratio of the transmission but to hold said planet carrier from rotation in the other direction during torque multiplication. This, of course, is based on the assumption that the brake band 64 which conditions the transmission for forward drive, is frictionally engaged with external wheel 66 of the free wheel device. With the brake band 64 out of contact with the wheel 66, the planet carrier is free to rotate in either direction. Any suitable means may be employed to operate the brake band 64, such for example, as hydraulic actuation, not shown. Axially extending pins 68 are carried by the planet carrier 58, for rotatably supporting a cluster of planet pinions 70, 72, and 74. These pinions 70, 72, and 74 are integrally related. A drum 76 is splined to one end of the sleeve 38, to the other end of which is fixedly attached the turbine wheel 28. A brake band 78, which connects the transmission for reverse, is arranged for frictional engagement with the drum 76. Any suitable means may be employed for actuating the brake band 78, such, for example, as hydraulic actuation, not shown. Frictional engagement of drum 76, holds the turbine wheel stationary for a purpose to be hereinafter described. A sun gear 80 is carried on the drum 76 for meshing engagement with the pinions 70. The hollow sleeve 36, which carries the reaction wheel 30, is provided with a sun gear 82 arranged for driving engagement with the planet pinions 72. The inner end of driven shaft 54 is equipped with a sun gear 84 which engages the teeth of planet pinion 74.

In the planetary gearing arrangement of Figure 1, the gear ratios are such that with the planet carrier 58 held fixed to accomplish forward drive the torque transmitted to the output shaft 54 from the turbine shaft 38 is approximately 1.5 (one and a half) times the torque impressed on the turbine shaft 38 up to the clutch point of the transmission, at which time input torque equals output torque. During this same period prior to the clutch point of the transmission, that is, prior to one to one torque ratio, the negative torque transmitted to the output shaft 54 from the guide shaft 36 is approximately only .7 (seven tenths) times the torque impressed on the reaction or guide shaft 36.

When in reverse drive the clutch band 78 locks sun gear 80, which is integrally related to shaft 38, to the other end of which is fixed the turbine wheel 50. The reaction wheel, which is now free to rotate, is driven in a direction opposite to the impeller wheel to thereby drive sun gear 82 which meshes with the planet pinions 72. Since the planet carrier is now free to rotate, the planet pinions 72 rotate about pins 68 as a moving center, driving the output shaft 54, through gears 74 and 84, with the reaction being taken through gears 70 and 80 into the band 78. In the present illustration the gear ratio of the guide shaft 36 to the output shaft 54 is in the neighborhood of 1.7 to 1. This ratio obviously provides for a relatively high torque at the output shaft compared to the torque impressed on the guide or reaction shaft at any instant of time. It is to be understood that wherever specific values are used herein it is for purpose of illustration only and the specification is therefore not to be limited thereby.

In order to pressurize the fluid for actuating the bands 64 and 78 and to put the fluid in the toroidal channel 46 under pressure a pump 91 is provided. The pump herein used to put the fluid under pressure is believed to embrace certain novel two-way driving features hereinafter described. The housing 10 is formed with an internal radially extending flange 86, drilled and threaded axially at 88 for the reception of screws 90, one only of which is shown. The screws pass through a pump housing 92 and threadedly engage the radial flange. A pump rotor 94 is mounted on a sleeve 96 to be driven thereby through a ball member 98. The sleeve 96 is concentrically positioned with respect to the sleeve 38 and rotates on sleeve bearings 100 interposed between the sleeve 38 and the sleeve 96. The latter sleeve is driven by two one-way clutches 102 and 104 but at different times, depending on which is rotating faster, the turbine or impeller wheel. The one-way clutch 102 is drivably interposed between the hollow stub shaft member 34 and the sleeve 96 so that when the speed ratio of turbine wheel to impeller wheel is less than one to one the pump rotor 94 will be revolved by the impeller to thereby pressurize the hydraulic circuit. Beyond a one to one speed ratio of turbine to impeller wheel the turbine wheel speed will be greater and hence drive the pump rotor. A collar member 106 connects the member 34 to the one-way clutch 102. When the speed ratio of turbine to impeller is less than one to one the one-way clutch 104, which is drivably interposed between the sleeve 96 and the sleeve 38, is overrunning. However, when the speed ratio of turbine to impeller is greater than one to one, as would be the case some time before the clutch point of the transmission was reached, as indicated by the intersection of the curves at 0, the turbine wheel, which is integral with sleeve 38, drives the pump rotor 94. At this time, the one-way clutch 102 is overrunning. A collar member 108 drivably connects the sleeve 38 to the one-way clutch 104. Outlet 110 of the pump communicates with the toroidal channel 46 through passages 112, 114, and 116. The toroidal channel 46 communicates with reservoir 118 through passages 120, 122, 124, past valve 126 and hence back to the reservoir via a conduit, not shown. The inlet of the pump, not shown, communicates with the reservoir 118, through an internal passage, not shown. The pump per se forms no part of the present invention but, as aforementioned, the manner of driving the same from two sources is believed novel.

A one-way clutch 130 is interposed between the concentric shaft 36 and the input shaft 12 so that this shaft can be driven by the vehicle at times to thereby drive the engine, not shown, so as to produce a braking or decelerating action on said vehicle. This mechanism is claimed per se in my application Serial No. 5,546, filed January 31, 1948.

Figure 3:
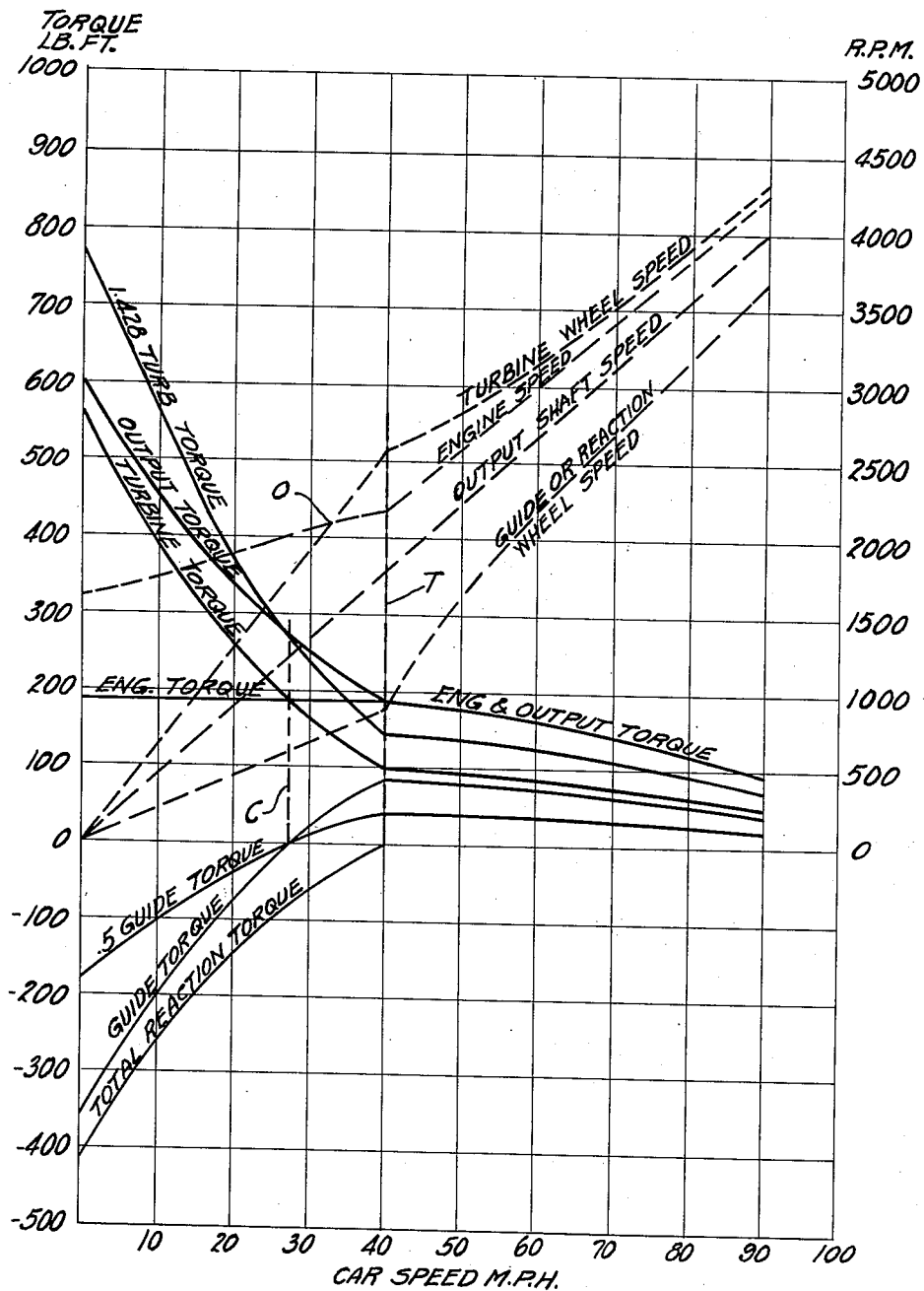
Figure 3 shows the performance curves of the transmission of Figure 1.

With reference to Figure 3 torque is represented by full line curves and R. P. M. by broken line curves. The reaction in the transmission is represented as a negative torque below the abscissa. The reaction on the guide or reaction wheel will be negative so long as the torque converter multiplies torque. As soon as torque multiplication in the converter has ceased, that is, torque input to the converter equals torque output of the converter, the reaction torque becomes zero, as indicated by the intersection of the abscissa and the reaction torque curves. This is commonly termed the "clutch point" of the converter and is that point at which the fluid enters the guide or reaction wheel at such an angle that no change in angular momentum of the fluid takes place. A vertical line C has been drawn through this point for ready reference to the condition of the elements of the transmission. Although the reaction torque of the reaction wheel has become zero, as aforementioned, the total reaction torque of the transmission is still negative due to torque multiplication in the planetary gear train 52, as best shown in Figure 3 where the total reaction torque is below the abscissa. When torque multiplication of the transmission ceases, that is, input and output torque become equal, the total reaction torque becomes zero, as indicated by the intersection of the "total reaction torque" curve with the abscissa. This point of intersection of the "total reaction torque" curve with the abscissa is defined as the "clutch point" of the transmission and a vertical line T is drawn therethrough for ready reference to the condition of other elements of the transmission at this point.

With the output shaft speed curve as a reference it will be noted that the reaction wheel speed increases at a slower rate and the turbine wheel speed increases at a greater rate up to the clutch point of the transmission, beyond which the curves representing the reaction and turbine wheel speeds converge on the curve representing the output shaft speed.

From a stall condition with the engine idling at about 1600 R. P. M. the engine speed curve rises to 2,150 R. P. M. at the clutch point T, of the transmission, during which time engine torque has remained substantially constant as shown by the engine torque curve. The output shaft and engine speed curves tend to converge at the clutch point. Beyond the clutch point T, that is, during the coupling range, engine speed continues to be greater than output shaft speed with a relatively small percentage of slip between them.

Between stall and the clutch point C of the converter the output torque at any instant is equal to the total turbine torque in the planetary gear train, which is represented by curve "1.428 turbine torque," minus .5 guide torque. Beyond the clutch point C of the converter the guide wheel torque becomes positive and is added to the turbine torque. At the clutch point T of the transmission engine torque equals output torque as shown by the intersection of the output and engine torque curves. This occurs at a vehicle speed of approximately 40 miles per hour.

Figure 2:
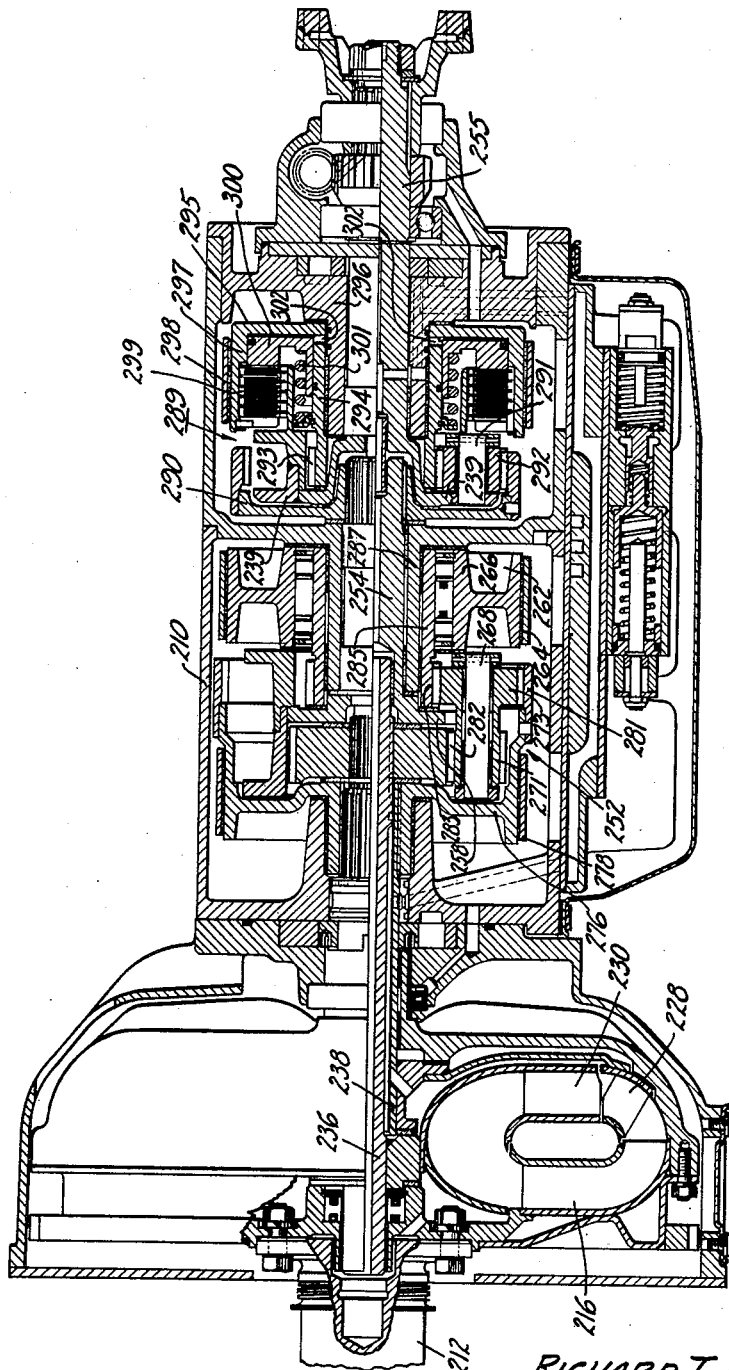
Figure 2 is a longitudinal sectional view of a modified form of transmission, with parts in elevation.

Figure 2 is a modified embodiment of the transmission in which the parts that are identical with those of the transmission of Figure 1 will have the same reference characters plus 200. Crankshaft 212 of an engine, not shown, is drivably connected to a torque converter 214, similar in construction to that of Figure 1, and having an impeller wheel 216, turbine wheel 228, and guide or reaction wheel 230. Concentrically related shafts 236 and 238 are drivably connected at one end to the reaction wheel 230 and turbine wheel 228 respectively. To the other ends of shafts 236 and 238 are splined a sun gear 282, and a ring gear 281 respectively, comprising two gear elements of a planetary gear train 252 interposed between the turbine and reaction wheels on the one hand and between these wheels and output shaft 254 on the other hand. A planet carrier 258 is integral with one end of the output shaft 254, and is provided with a pin 268 on which pinions 271 and 273 are mounted for meshing engagement with sun gear 282 and ring gear 281 respectively. A second sun gear 283 engages the teeth of the pinion 273 and is integral with a sleeve shaft 285 concentrically positioned with respect to the output shaft 254 and carried by an axially extending wall 287 of housing 210. A free wheel device 262 is interposed between the second sun gear 283 and a forward drive brake band 264 to allow free rotation of said second sun gear in one direction beyond torque unity in the transmission but to hold said second sun gear from rotation in the other direction during torque multiplication. Any suitable means, such as hydraulic actuation, not shown, may be employed to actuate brake band 264 to cause the same to frictionally engage external wheel 266 of the free wheel device. When brake band 264 is out of contact with wheel 266 the second sun gear is free to rotate in either direction. Brake band 278, which may be actuated in a manner similar to brake band 264, is constituted to frictionally engage support 276 which carries the ring gear 281, to thereby hold the turbine wheel and hence the ring gear stationary when the transmission is connected for reverse drive. During this time the forward brake band 264 is released. When connected in this manner the guide wheel is rotated in a direction opposite to that of the impeller wheel so as to impart reverse rotation to the output shaft 254, at which time the sun gear 282 drives the planet carrier in a reverse direction and at a reduced speed.

In forward drive, at which time brake band 278 is released, and brake band 264 engages wheel 266 to thereby hold the second sun gear 283 against rotation in one direction, the turbine wheel rotates in the same direction as the impeller wheel, and the ring gear 281 rotates the pinions 271 and 273, hence driving the planet carrier forward and turning the guide wheel in the same direction as the turbine wheel and at a fixed speed ratio.

Frequently when passing another vehicle or to obtain greater torque at low speeds, it is desirable to shift down into a lower gear to obtain additional torque for quick acceleration and to this end I have provided a reduction gear train 289 which is interposed between output shafts 254 and 255. This planetary gear train 289 embraces a ring gear 290 splined on the opposite end of output shaft 254 from the planet carrier 258. Intermeshing with the ring gear 290 is a pinion 291, pivotally mounted on a pin 292, which is integral with a planet carrier 239 securely fixed to the inner end of output shaft 255, so as to rotate said shaft. A sun gear 293 is fixedly secured to the inner wall 294 of an annular shaped drum 295, rotatably mounted on the axially extending tubular portion 296 of the housing 210. The drum 295 is also equipped with an outer wall 297 engageable by a brake band 298 when it is desired to hold said sun gear 293 fixed. Actuation of said brake band 298 may be performed in any suitable manner, such as hydraulic actuation, not shown. A disc clutch 299 is interposed between the drum 295 and planet carrier 239. The discs are arranged axially in said drum and are supported alternately by the drum and planet carrier so that axial compression of said discs will tie the drum to the planet carrier to thereby rotate said drum and carrier as a unit. A fluid pressure operated piston 300 is disposed between the inner and outer walls 294 and 297 of the drum for axial displacement against said discs. A spring 301 normally urges said piston in a direction to relieve compression of the discs, as shown in the drawings, so that the planet carrier 239 is free to revolve, with respect to the sun gear 293. Fluid under pressure from a source, not shown, is connected to a passage 302 which communicates with the back side of piston 300.

When the transmission is connected for direct drive, that is, with output shafts 254 and 255 rotating as a single shaft, brake band 298 is disengaged from the outer wall 297 and piston 300 is urged to the left under the influence of fluid under pressure, to thereby compress the disc clutch which couples the planet carrier and drum together as a unit.

Should it be desired to shift the transmission into a lower gear ratio to obtain additional torque for increasing vehicle acceleration the fluid under pressure acting on the piston is released and the clutch band 298 is caused to engage the drum 295. The spring 301 will return the piston to the position shown in the drawing, which relieves the compression on the discs. The sun gear 293 is now the fixed member of the planetary gear train and takes the reaction from the pinions of the planet carrier which now drives the output shaft 255 at a reduced speed with respect to output shaft 254.

Operation and function of the transmission:

Referring now to Figure 1, with the crankshaft 12 rotating and clutch bands 64 and 78 released, there can be no torque reaction and consequently no torque multiplication. If the forward brake band 64 is now caused to frictionally engage the external wheel 66 a negative torque reaction is taken thereby through the planet carrier 58, thence through the free wheel device 62. Shortly after the brake band has locked the transmission into forward drive, torque will be impressed on the output shaft 54, which will begin to rotate when the torque reaches a value sufficient to overcome the load on the output shaft. The torque impressed on the input shaft is first multiplied in the torque converter, thence transmitted through the sleeve 38, to which sun gear 80 is drivably connected, and into the planetary gear train 53, where the torque is again multiplied before being transferred to the output shaft. During the period of torque multiplication in the transmission, that is, as long as torque output exceeds torque input, the reaction will be in a direction through said free wheel device 62 to lock the same against rotation. During this period the reaction wheel is driven forward in the same direction as the impeller and turbine wheels but at a rate less than turbine wheel speed. That is the reaction wheel is driven forward at a fixed ratio with respect to the turbine wheel. As hereinbefore explained this is accomplished by interposing the planetary gear train between the turbine and reaction wheels. Beyond a torque ratio of unity, that is, the clutch point of the transmission, at which time torque reaction in the transmission has ceased, the planet carrier 58 will be free to rotate in a direction opposite to that in which reaction was tending to rotate said planet carrier.

At this time the torque converter is performing as a hydraulic coupling. As is obvious from an examination of the curves of Figure 3, beyond the "clutch point" of the transmission the turbine wheel speed rises at a slower rate, the engine speed rises at a greater rate, and the guide or reaction wheel speed also rises at an increased rate. This trend will continue with the input shaft speed approaching the output shaft speed as the car speed is increased.

Assume a condition in the transmission wherein the forward brake band 64 is released and the reverse brake band 78 is caused to frictionally engage the drum 76, to thereby lock the sun gear 80 against rotation. With this arrangement the turbine wheel 50 is held against rotation, since it is carried by the sleeve 38 onto which the locked sun gear 80 is splined. The reaction wheel will be revolved in a direction opposite to the impeller wheel, under the influence of the circulating fluid, to thereby drive the concentric shaft 36. The sun gear 82 is securely fixed to the other end of the shaft 36 for driving engagement with the planet pinion 72. This drives the output shaft in a reverse direction and at a reduced speed.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

I claim:

1. A transmission comprising a hydro-kinetic torque converter having rotatable bladed impeller, turbine, and reaction wheels, when rotated, said impeller wheel circulates fluid which acts on said turbine and reaction wheels tending to rotate the turbine wheel forward and the reaction wheel backward with respect to the impeller wheel, a planetary gear train including a planet carrier supporting a double planet pinion, a first gear element arranged in meshing relationship to one of said pinions, a connection between said first gear element and said turbine wheel, a second gear element arranged in meshing relationship to the other of said pinions, a connection between said second gear element and said reaction wheel, and means for taking reaction comprising a third gear element arranged in meshing relationship with said one pinion.

2. A transmission comprising a torque converter equipped with rotatable bladed impeller, turbine, and reaction wheels, when rotated, said impeller wheel circulates fluid which acts on said turbine and reaction wheels tending to drive the former forward and the latter in reverse with respect to the impeller wheel, a first gear connected to said turbine wheel, a second gear connected to said reaction wheel, a double planet pinion having different pitch diameters, one of said pinions meshing with said first gear and the other meshing with said second gear to provide a positive forward drive to said reaction wheel, a planet carrier supporting said double planet pinion, an output shaft to which said planet carrier is connected, means for taking reaction when the output shaft is to be driven forward, and means for holding said first gear when the output shaft is to be driven in reverse.

3. A transmission comprising a hydro-kinetic torque converter having rotatable bladed impeller, turbine, and reaction wheels, when rotated, said impeller wheel circulates fluid which acts on said turbine and reaction wheels tending to rotate the turbine wheel forward and the reaction wheel backward with respect to the impeller wheel, a planetary gear train comprising a planet carrier supporting a pair of planet pinions relatively fixed for rotation about a common axis, a gear element arranged in meshing relationship with one of said pinions and having a connection to said turbine wheel, a second gear element arranged in meshing relationship to the other of said pinions and having a connection to said reaction wheel, said gear elements being in a ratio such that the reaction wheel is driven forward by the turbine wheel at a lesser speed than the latter, an output shaft drivably connected to said planet carrier, and means for taking the reaction of said planetary gear train and said torque converter.

4. A transmission comprising a hydro-kinetic torque converter having rotatable bladed impeller, turbine, and reaction wheels, when rotated, said impeller wheel circulates fluid which acts on said turbine and reaction wheels tending to rotate the turbine wheel forward and the reaction wheel backward with respect to the impeller wheel, a planetary gear train including a planet carrier supporting a double planet pinion, a gear element arranged in meshing relationship with one of said pinions and having a connection to said turbine wheel, a second gear element arranged in meshing relationship with the other of said pinions and having a connection to said reaction wheel, said gear elements being in a ratio such that the reaction wheel is driven forward by the turbine wheel at a lesser speed than the latter, an output shaft drivably connected to said planet carrier, and a third gear element arranged in meshing relationship with said one pinion, and means for holding said third gear element against rotation during torque multiplication.

5. A transmission comprising a hydraulic torque converter having rotatable bladed impeller, turbine, and reaction wheels, said transmission having a stage of operation wherein rotation of said impeller wheel circulates fluid which acts on said turbine wheel to drive the same forward at a speed greater than that of the impeller wheel and acts on said reaction wheel tending to drive it in the same direction as the impeller wheel, a first gear element connected to said turbine wheel, a second gear element connected to said reaction wheel, a double planet pinion, one of said pinions meshing with the first gear element and the other meshing with the second gear element, an output shaft, a planet carrier supporting said pinions and carried by said output shaft, and means for taking reaction.

6. A transmission comprising a torque converter equipped with impeller, turbine, and reaction wheels when rotated, said impeller wheel circulates fluid which acts on said turbine and reaction wheels tending to drive the former forward and the latter backward with respect to said impeller wheel, a first gear connected to said turbine wheel, a second gear connected to said reaction wheel, a double planet pinion having different pitch diameters, the smaller pinion meshing with said second gear and the larger pinion meshing with said first gear so that rotation of said turbine wheel drives said reaction wheel forward at a lesser speed than the turbine wheel, output means including a planet carrier for supporting said pinion, and means for taking reaction.

7. A transmission comprising a hydraulic torque converter having rotatable bladed impeller, turbine, and reaction wheels, said transmission having a first stage of operation wherein rotation of said impeller wheel causes fluid to act on said turbine wheel to drive the same forward at a lesser speed than that of the impeller wheel, and on said reaction wheel tending to drive it backward, a first gear element connected to said turbine wheel, a second gear element connected to said reaction wheel, a third gear element, means for holding said third gear element, a double planet pinion interposed between said gear elements to provide a positive forward drive for said reaction wheel during the first stage of operation, a planet carrier supporting said double planet pinion, and an output shaft to which the planet carrier is connected for driving the former, said transmission having a second stage of operation wherein rotation of said impeller wheel causes fluid to act on said turbine wheel to drive it forward at a greater speed than impeller wheel speed, and at the same time the fluid acts on said reaction wheel causing it to rotate forward, whereby the output shaft overdrives the impeller wheel.

8. A transmission including a hydraulic torque converter having rotatable bladed impeller, turbine, and reaction wheels, all of which rotate forward, a planetary gear train including a planet carrier supporting a double planet pinion, a gear element meshing with one of said pinions and having a connection to said turbine wheel, a second gear element meshing with the other of said pinions and having a connection to said reaction wheel, an output shaft drivably connected to said planet carrier, said reaction and turbine wheels being interconnected through said planetary gear train in such a manner that the latter wheel drives the former wheel forward at a fixed ratio during torque multiplication in the converter, after torque multiplication said reaction wheel is rotated forward under the influence of fluid from the impeller wheel, thus producing a forward torque, said planetary gear train capable of combining said forward torque from the reaction wheel with turbine wheel torque, and means connected to said double planet pinion for taking reaction.

9. A transmission including a hydraulic torque converter having rotatable bladed impeller, turbine, and reaction wheels all of which rotate forward, an output shaft, a planet carrier drivably connected to said output shaft and supporting a double planet pinion, means including gears connecting said double planet pinion to the reaction and turbine wheels, said double planet pinion being of different pitch diameters and so related to said gears that at times forward torque from the turbine wheel is transferred to said planet carrier to rotate the output shaft and to drive the reaction wheel forward at a fixed ratio, the ratios between the double planet pinion and the gears being such that after torque unity in the converter, forward torque from said converter is divided in a fixed ratio between the reaction and turbine wheels, and means for taking reaction from said pinion.

RICHARD T. BURNETT.

(References on following page)

REFERENCES CITED

The following references are of record in the file of this patent:

UNITED STATES PATENTS

| Number | Name | Date |
|---|---|---|
| 1,026,448 | Marston | May 14, 1912 |
| 2,013,126 | Bonn | Sept. 3, 1935 |
| 2,158,557 | Van Lammeren | May 16, 1939 |
| 2,162,803 | England | June 20, 1939 |
| 2,277,214 | Dodge | Mar. 24, 1942 |
| 2,280,015 | Tipton | Apr. 14, 1942 |
| 2,284,123 | Breer et al. | May 26, 1942 |
| 2,291,120 | Tipton | July 28, 1942 |
| 2,306,834 | Tipton | Dec. 29, 1942 |
| 2,324,713 | MacFarland | July 20, 1943 |
| 2,326,994 | Duffield | Aug. 17, 1943 |
| 2,371,574 | Swennes | Mar. 13, 1945 |
| 2,373,234 | Duffield | Apr. 10, 1945 |
| 2,406,225 | Kelbel | Aug. 20, 1946 |
| 2,472,878 | Bauman | June 14, 1949 |